United States Patent
Wang

(10) Patent No.: US 7,259,534 B1
(45) Date of Patent: Aug. 21, 2007

(54) METHOD FOR CONTROLLING SPINDLE MOTOR BY TIME LENGTH FOR PASSING THROUGH DEFECT

(75) Inventor: Liang-Yen Wang, Lujhou (TW)

(73) Assignee: Ali Corporation, Taipei (TW)

( * ) Notice: Subject to any disclaimer, the term of this patent is extended or adjusted under 35 U.S.C. 154(b) by 0 days.

(21) Appl. No.: 11/420,633

(22) Filed: May 26, 2006

(51) Int. Cl.
*G05B 11/01* (2006.01)
(52) U.S. Cl. .............. 318/560; 318/565; 360/75; 360/78.04
(58) Field of Classification Search ............ 318/560, 318/565, 66; 360/78.04, 75
See application file for complete search history.

(56) References Cited

U.S. PATENT DOCUMENTS 5,737,762 A * 4/1998 Hattori ................... 711/165
6,239,935 B1 * 5/2001 Shrinkle ..................... 360/75
6,661,751 B2 * 12/2003 Asakura ................... 369/44.27
2003/0156516 A1 * 8/2003 Tanaka ..................... 369/53.3

* cited by examiner

*Primary Examiner*—Rina Duda
(74) *Attorney, Agent, or Firm*—Birch, Stewart, Kolasch & Birch, LLP

(57) ABSTRACT

A method of use a defect measure to control spindle motor is described. A system gets the defect situation from a CD by referring a maximum time of pass through the defect and a total time of pass through the defect. According the maximum scrape and the scrape of whole CD, the system adjusts a speed of the spindle motor for reducing a bad effect upon the system. When pass through the defect, the system reduce the speed of the spindle motor for saving power consumption.

15 Claims, 4 Drawing Sheets

METHOD FOR CONTROLLING SPINDLE MOTOR BY TIME LENGTH FOR PASSING THROUGH DEFECT

BACKGROUND OF THE INVENTION

1. Field of the Invention

The present invention is related to a method for controlling a spindle motor of an optical storage device, and more particularly to a method for controlling a spindle motor in accordance with a time length for passing through defect.

2. Description of Related Art

According to the present optical storage technology, the control modes for a spindle motor are as follows. One is CAV (Constant Angular Velocity) mode, in which a compact disc may adopt an identical rotation rate from inner to outer circles for improving the reading speed so that the more data read on the outer circles per unit time, the faster the reading speed. Another is CLV (Constant Linear Velocity) mode, in which owing to a spiral structure of the compact disc, the outer circle with longer circumference will have a faster reading speed as compared with the inner circle so that if it intends to maintain an identical reading speed, the rotation speed of the compact disc has to be gradually reduced with the laser pick-up head moving outwardly for maintaining an identical reading speed. Another is P-CAV (Partial CAV) mode, in which the CD-ROM drive reads the data in the CAV mode as reading a general CD and in the CLV mode as reading an audio CD for maintaining the stability of sound track picking-up. Still another is zone CLV mode, which will divide the CD into several zones from inner circle to outer circle, and in each zone, the burning speed will be maintained at a stable CLV speed.

However, in an optical storage system, when the reading CD is a defect CD, it is helpful that the defect is passed through quickly if the rotation speed of the spindle motor is increased so that the error of the focus servo or the tracking servo in the optical storage system can be reduced. Generally, multimedia player utilizes a low rotation speed CLV mode system for saving power consumption, and thus, as passing a bigger defect, it may sometimes have a serious mosaic or pause situation, or even can not be read and cause a crash that may seriously influence the playing quality. Furthermore, in the CLV mode, because the rotation speed is namely the data transmission rate, the data may have an error if randomly changing the rotation speed.

Therefore, since all the above-described CAV mode, CLV mode, P-CAV mode and zone CLV mode do not have any specific control mode for passing through the defect in an optical storage system, it still needs to be improved.

SUMMARY OF THE INVENTION

Therefore, the present invention provides a processing procedure for a defect CD and a skill for changing speed in CLV mode so as to increase the playing efficiency of a defect CD, no matter how big the scrape on the CD is.

The present invention provides a method for controlling a spindle motor by a time length passing through scrape which is executed by a microprocessing unit. Firstly, the microprocessing unit detects if the reading head has a SEEK situation. If there does not exist the SEEK situation, the microprocessing unit will determine if the sampling time is arrived. If the SEEK situation occurs, the rotation speed of the spindle motor will be changed to be a high speed, and then, the microprocessing unit will check that if the sampling time is arrived. If the sampling time is arrived, it will read the longest time and the accumulation time for passing through scrape in the digital signal processing unit. Then, the microprocessing unit will check a list according to the longest time and the accumulation time for passing through scrape so as to output a spindle motor rotation speed command. Continuously, it will check that if the data buffer is full. If the data buffer is full, the spindle motor rotation speed command is executed to adjust the rotation speed of the spindle motor.

The present invention further provides a method for detecting the longest time and also the accumulation time for passing through scrape, as described above, which is executed by the digital signal processing unit. The digital signal processing unit firstly determines that if there any scrape is detected. If the scrape is detected, it will calculate the time for passing through scrape and store thereof, and continuously detect if there exists any other scrape after storage. If the scrape is not detected, it will determine that if there exists any time for passing through scrape. If there exists the time for passing through scrape, it will then determine that if the longest time and the accumulation time for passing through scrape are read by the microprocessing unit. If the longest time and the accumulation time for passing through scrape are read by the microprocessing unit, the longest time for passing through scrape will be cleaned. If the longest time and the accumulation time for passing through scrape are not read, it will determine that if the time for passing through scrape is the longest time for passing through scrape. If the time for passing through scrape is the longest time for passing through scrape, it is set to be the longest time for passing through scrape, and then, the time for passing through scrape are added for producing the accumulation time for passing through scrape. Finally, the stored time for passing through scrape is cleaned.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1:
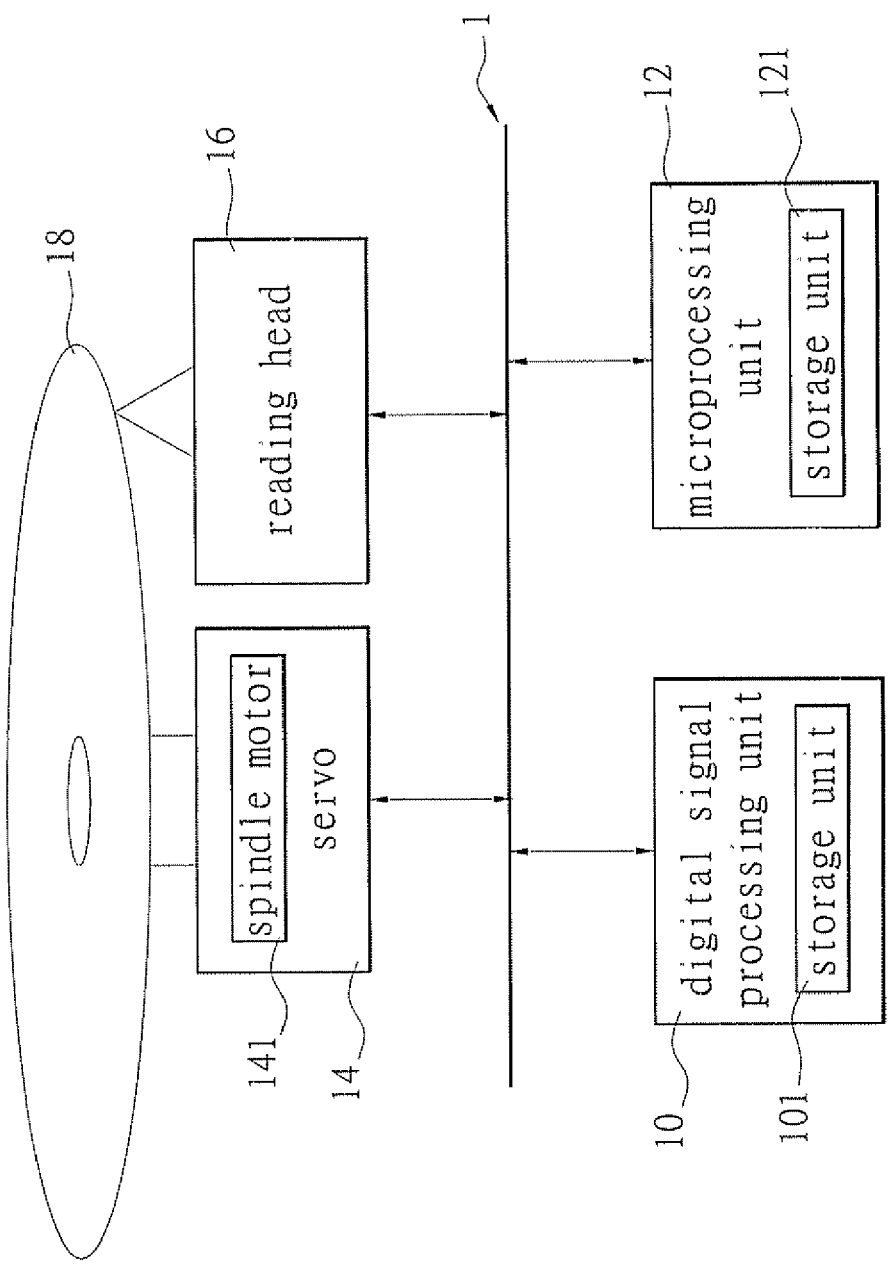
FIG. 1 is a block diagram showing the hardware control of the present invention.

Please refer to FIG. 1, which is a block diagram showing the hardware control of the present invention. In an optical storage system 1, according to the present invention, a digital signal processing unit 10 is served to process the signal of a servo 14, and a microprocessing unit 12 is served to control the optical storage system 1, wherein the digital signal processing unit 10 utilizes a storage unit 101 to storage relative transient variables and digital signal process numbers, and the microprocessing unit 12 utilizes a storage unit 121 to storage relative variables and firmware. The digital signal processing unit 10 is used to detect the scrape, and when the reading head 16 reading the scrape place on the compact disc 18, it will start to add the time length needed to pass through the scrape. Then, the maximum and the total vale of time length detected by the digital signal processing unit 10 are recorded, wherein the maximum and the total value of time length detected by the digital signal processing unit 10 at least can let the spindle motor 141 to turn a circle. When the optical storage system 1 reads the time length for passing through scrape that is recorded by the digital signal processing unit 10, the digital signal processing unit 10 may re-sample and re-calculate the size of the scrape. Here, the purpose for recording the maximum and total vale of the time for passing through scrape is to a reference for the optical storage system so that the optical storage system 1 can immediately be notified of the scrape situation of the compact disc 18, the longest scrape length and if the whole compact disc 18 is seriously scraped. Therefore, the rotation speed of the spindle motor 141 can be increased at a proper time for reducing a bad influence on the optical storage system 1 owing to the scraped CD 18. Furthermore, when the action for reading the compact disc 18 passes through the scrape on the compact disc 18, the rotation speed of the spindle motor 141 can be slowed down for reducing the power consumption.

Figure 2:
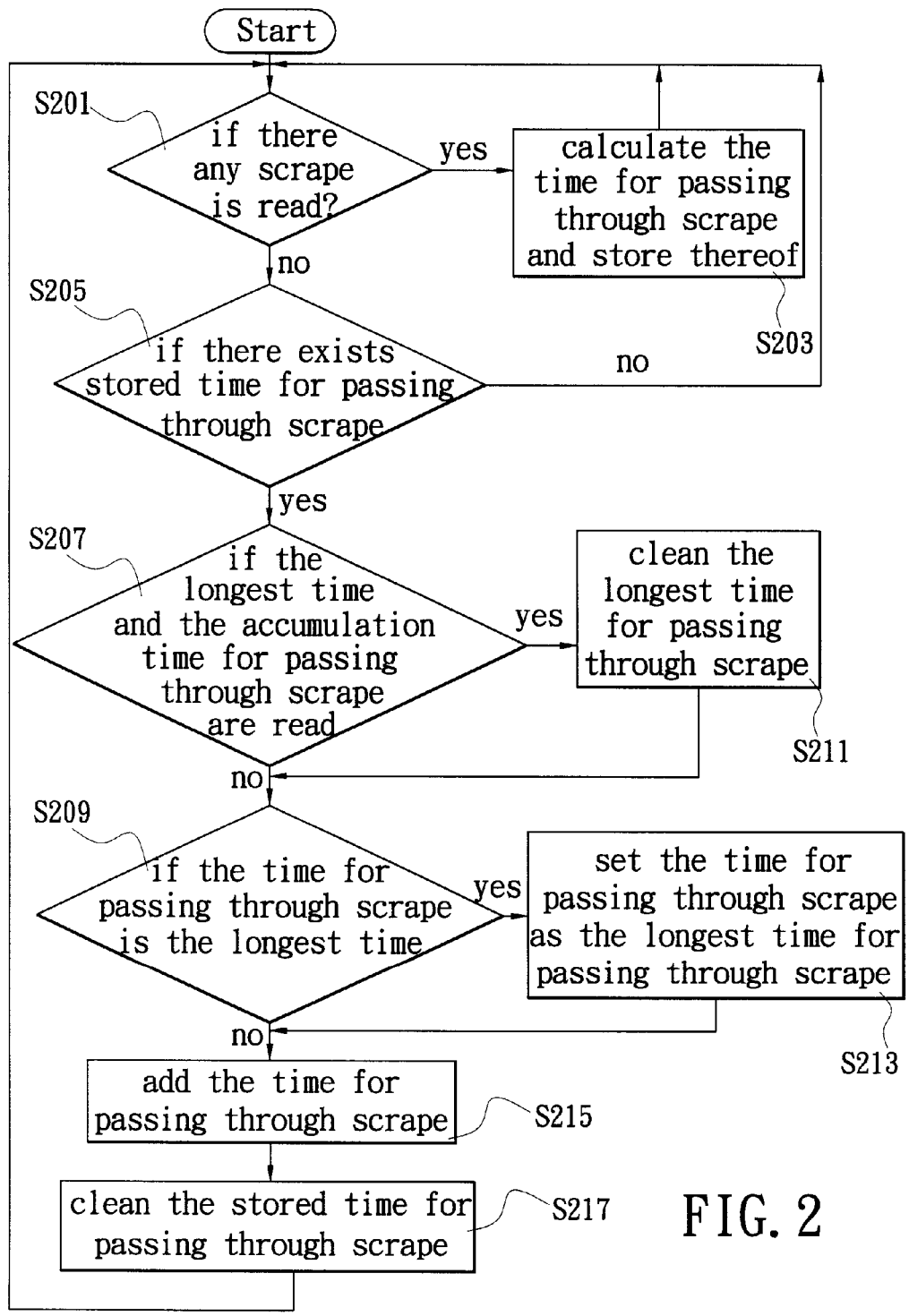
FIG. 2 is a flowing chart showing scrape detection of the present invention.

Please refer to FIG. 2, which is a flow chart showing a scrape detection. Firstly, when the reading head reads the compact disc, the digital signal processing unit will simultaneously detect if there any scrape is read on the compact disc (as step S201 shown in FIG. 2). If the digital signal processing unit detects that there exists scrape on the compact disc, it will calculate the time for passing through scrape and store thereof in the storage unit, and then, the whole process returns to step S201 for continuous detection (as step S203 shown in FIG. 2). If the digital signal processing unit does not detect that the scrape situation is read on the compact disc, it will check that if there exists any time for passing through scrape stored in the storage unit (as step S205 shown in FIG. 2). If there does not exist any time for passing through scrape, the whole process returns to step S201 for continuous detection. If there exists the time for passing through scrape in the storage unit, it will then determine that if the longest time and the accumulation time for passing through scrape which are stored in the storage unit are read by the microprocessing unit (as step S207 shown in FIG. 2). If the longest time and the accumulation time for passing through scrape are not read by the microprocessing unit, it will determine that if the time for passing through scrape which is stored in the storage unit is the longest time for passing through scrape (as step S209 shown in FIG. 2). If the longest time and the accumulation time for passing through scrape are read in step S207 by the microprocessing unit, the longest time for passing through scrape stored in the storage unit will be cleaned, and then, step S209 is continuously executed (as step S211 shown in FIG. 2). If the longest time for passing through scrape is not the longest time, add to the accumulation time for producing an accumulation time that represents the accumulation vale of all times for passing through scrape so as to provide the system to determine the scrape degree (as step S215 shown in FIG. 2). If the time for passing through scrape in step S209 is the longest time for passing through scrape, the time is set to be the longest time for passing through scrape, and then, step S215 is executed after setting (as step S213 shown in FIG. 2). After step S215, the time for passing through scrape stored in the storage unit (which is the time stored in step S203 and not the accumulation time in step S215) is cleaned, and after cleaning, the process returns to step S201 for continuous detecting that if the reading head reads any scrape on the compact disc.

Figure 3:
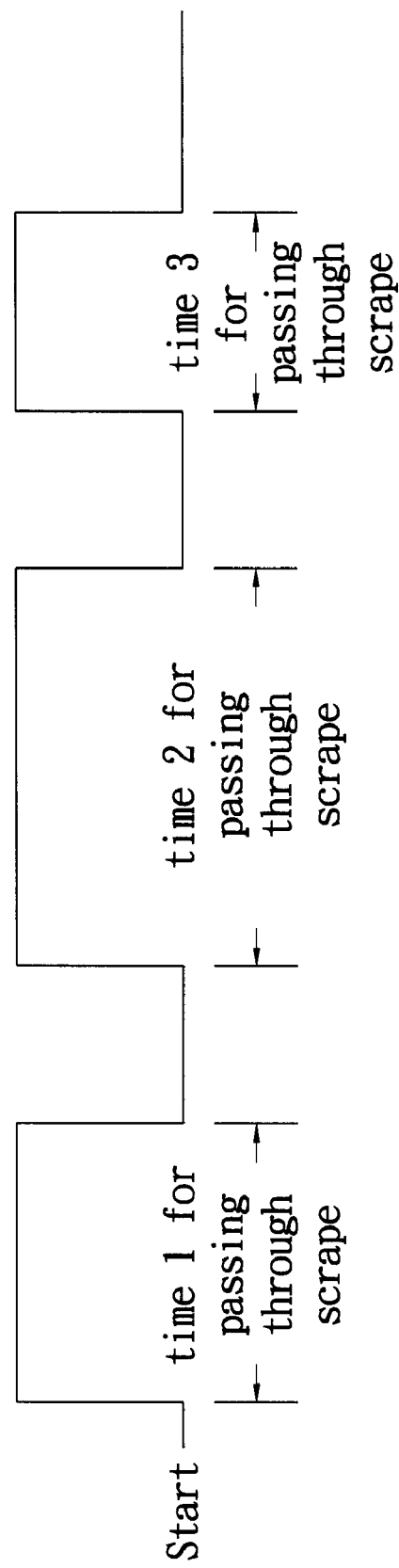
FIG. 3 is a schematic view showing the calculation of the time for passing through scrape.

The above described step S209 for determining if the time for passing through scrape is the longest time can be achieved by comparing with the longest time for passing through scrape stored in the storage unit. If the time is larger than the longest time stored in the storage unit, the longest time stored in the storage unit will be updated. Please refer to FIG. 3 which is a schematic view showing the calculation of the time for passing through scrape. At beginning, like step S201 in FIG. 2, it starts to detect if there exists the reading scrape situation, and if it found the situation, the time for passing through scrape is calculated, as time 1, time 2, and time 3 for passing through scrape in FIG. 3. After time 1 is detected and recorded, it will be recorded as the longest time (because this is the first time to detect a time for passing through scrape and there does not exist any longest time for passing through scrape is stored). Then, time 2 is detected and is compared with time 1, and because time 2 is larger than time 1, time 2 is recorded as the longest time (as step S209 and step 213 in FIG. 2). As to the accumulation time for passing through scrape as in step S215 in FIG. 2, it is produced by adding time 1, time 2 and time 3.

Figure 4:
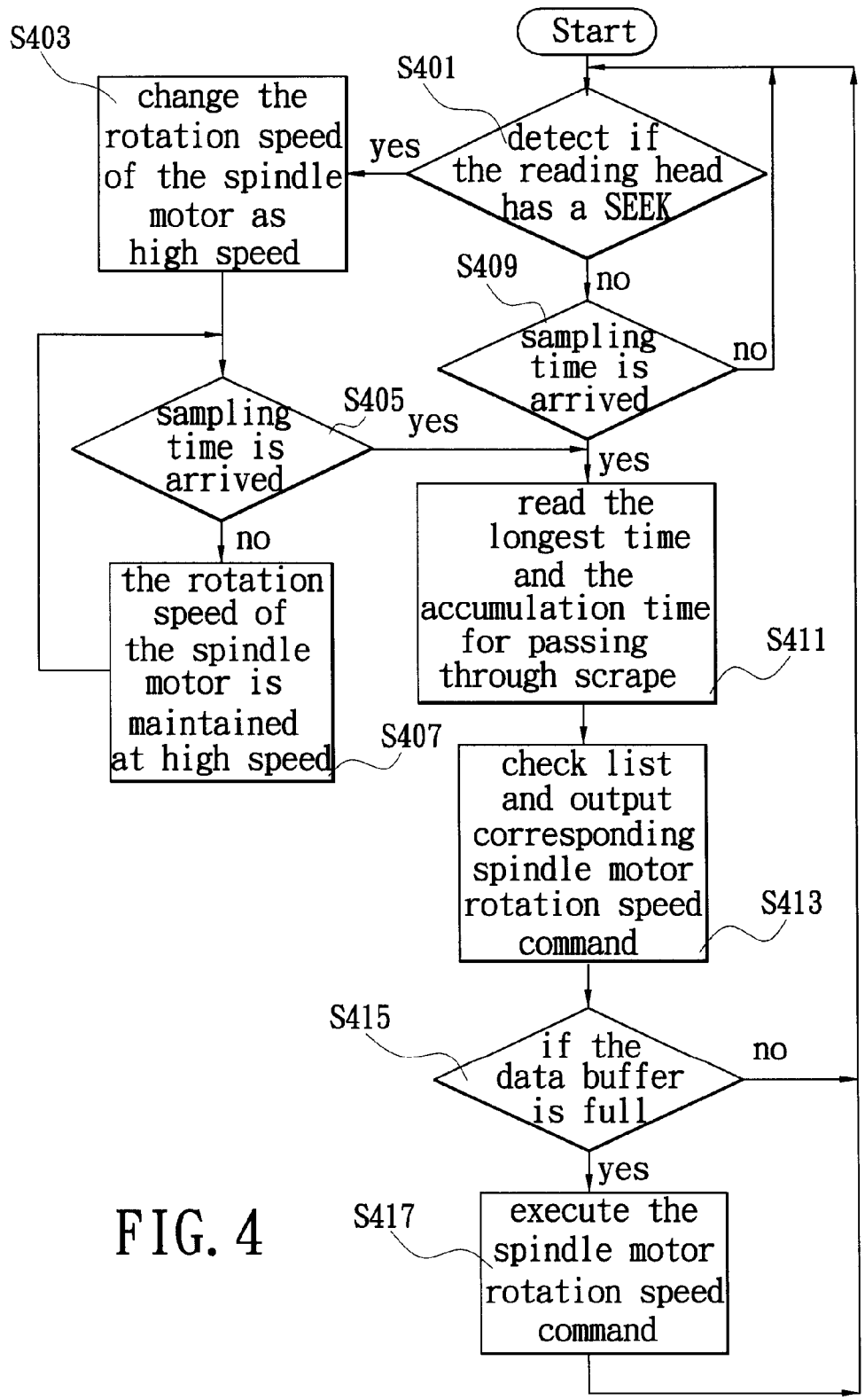
FIG. 4 is a control flow chart of the optical storage system according to the present invention.

Further more, please refer to FIG. 4 which is a flow chart showing the control of optical storage system. Firstly, the microprocessing unit detects if the reading head has a SEEK situation (as step S401 in FIG. 4). If the SEEK situation occurs, the rotation speed of the spindle motor of the CD-ROM drive will be changed and is controlled at a high speed (as step S403 in FIG. 4). Then, the microprocessing unit checks that if the sampling time is arrived. If the sampling time is arrived, the spindle motor is maintained at high speed and continuously checks if the sampling time is arrived (as step S407 in FIG. 4). On the other hand, if there does not exist the SEEK situation after step S401, the microprocessing unit will check if the sampling time is arrived (as step S409 in FIG. 4). If the sampling time is not arrived, it returns to step S401. If the sampling time is arrived in step S409 and step S405, the microprocessing unit reads the longest time and the accumulation time for passing through scrape in the storage unit in the digital signal processing unit (as step S411 in FIG. 4). Then, the microprocessing unit will check a spindle motor rotation speed command list according to the longest time and the accumulation time for passing through scrape for outputting a proper spindle motor rotation speed command so as to produce a proper rotation speed for passing the scrape (as step S413 in FIG. 4). Then, it will first check that if the data buffer for reading data is full (as step S415 in FIG. 4) and not perform the outputted command. If the data buffer is not full, the process returns to step S401 for continuous detection. If the data buffer is full, then the outputted spindle motor rotation speed command is executed (as step S417 in FIG. 4). Continuously, the process returns to step S401 for continuously detecting the SEEK situation.

The above-described step of executing the outputted command after the data buffer is full is to avoid a sudden rotation speed change during data reading which may cause the read data to have an error. Therefore, when a scrape situation is found, it will firstly determine the increase of the rotation speed, wait for the data buffer to be full and then change the rotation speed so as to avoid an error data.

Moreover, in the checking and comparing method described above, the longest time for passing through scrape can be compared with a first standard value and the accumulation time for passing through scrape can be compared with a second standard value, wherein if the longest time for passing through scrape is located in the first standard range, or the accumulation time is located in the second standard range, the microprocessing unit can output a general speed spindle motor rotation speed command for controlling the rotation speed of the spindle motor at a normal speed, if the longest time for passing through scrape is larger than an upper limit of the first standard range or the accumulation time for passing through scrape is larger than an upper limit of the second standard range, the microprocessing unit will output a high speed spindle motor rotation speed command for controlling the spindle motor at a high speed, and if the longest time for passing through scrape is smaller than a lower limit of the first standard range or the accumulation time for passing through scrape is smaller than a lower limit of the second standard range, the microprocessing unit will output a low speed spindle motor rotation speed command for controlling the spindle motor at a low speed.

In the aforesaid, the present invention utilizes a digital signal processing unit to process the signal of a servo and detect a longest time and an accumulation time for passing through scrape so as to provide the microprocessing unit the information as a reference for understanding the defect situation on the compact disc, and thus, the rotation speed of the spindle motor can be adjusted in a proper time for reducing a bad influence on the system caused by the scrape on the compact disc. Furthermore, after passing through the scrape, the rotation speed can be reduced for saving power consumption.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for controlling a spindle motor by a time length of passing through a defect, comprising steps of:
   when a reading head is reading a compact disc, detecting if the reading head has a SEEK situation;
   if the reading head has no SEEK situation, determining whether a sampling time is arrived;
   if the reading head has the SEEK situation, changing a rotation speed of the spindle motor into a high rotation speed and determining whether the sampling time is arrived;
   if the sampling time is arrived, reading a longest time for passing through a scrape and an accumulation time for passing through a scrape;
   checking a spindle motor rotation speed list according to the longest time and the accumulation time so as to output a spindle motor rotation speed command;
   checking if a data buffer is full; and
   if the data buffer is full, performing the spindle motor rotation speed command so as to adjust the rotation speed of the spindle motor.

2. The method according to claim 1, wherein the method is executed by a microprocessing unit.

3. The method according to claim 2, wherein if the longest time for passing through the scrape is located in a first standard range in the spindle motor rotation speed list or the accumulation time for passing through the scrape is located in a second standard range, the microprocessing unit outputs a general speed spindle motor rotation speed command for controlling the spindle motor at a general speed.

4. The method according to claim 3, wherein if the longest time for passing through the scrape is smaller than a lower limit of the first standard range or the accumulation time for passing through the scrape is smaller than a lower limit of the second standard range, the microprocessing unit outputs a low speed spindle motor rotation speed command for controlling the spindle motor at a low speed.

5. The method according to claim 3, wherein if the longest time for passing through the scrape is larger than an upper limit of the first standard range or the accumulation time for passing through the scrape is larger than an upper limit of the second standard range, the microprocessing unit outputs a high speed spindle motor rotation speed command for controlling the spindle motor at a high speed.

6. The method according to claim 2, wherein if the sampling time is arrived, the microprocessing unit reads the longest time and the accumulation time for passing through the scrape from a storage unit in a digital signal processing unit.

7. The method according to claim 1, wherein if the sampling time is not arrived, going back to the step of detecting if the reading head has the SEEK situation.

8. The method according to claim 1, wherein if the data buffer is not full, going back to the step of detecting if the reading head has the SEEK situation.

9. A method for detecting a longest time and an accumulation time for passing through a scrape comprising steps of:
   when a reading head is reading a compact disc, detecting if the compact disc has a scrape;
   if the compact disc has a scrape, calculating and storing a time for passing through the scrape and continuously detecting if the compact disc has any other scrape after storing;
   if the compact disc has no scrape, determining if a time for passing through the scrape is stored;
   if the time for passing through the scrape is stored, determining if the longest time and the accumulation time for passing through scrape are read;
   if the longest time and the accumulation time for passing through the scrape are read, cleaning the longest time for passing through scrape;
   if the longest time and the accumulation time for passing through the scrape are not read, determining if the stored time for passing through the scrape is longer than the longest time for passing through the scrape;
   if the stored time for passing through the scrape is longer than the longest time for passing through the scrape, setting the stored time for passing through the scrape as the longest time for passing through the scrape;
   adding up the times for passing through the scrape and producing the accumulation time for passing through the scrape; and
   cleaning the stored time for passing through the scrape.

10. The method according to claim 9, wherein the method is executed by a digital signal processing unit.

11. The method according to claim 10, wherein the longest time and the accumulation time for passing through the scrape are stored in a storage unit of the digital signal processing unit.

12. The method according to claim 11, wherein the longest time and the accumulation time for passing through the scrape are read from the storage unit by a microprocessing unit.

13. The method according to claim 12, wherein the longest time and the accumulation time for passing through the scrape at least makes the microprocessing unit to control a spindle motor to rotate a circle.

14. The method according to claim 10, wherein if the time for passing through the scrape has been stored, it goes back to detect if there has any other scrape on the compact disc.

15. The method according to claim 10, wherein if the stored time for passing through the scrape is not longer than the longest time for passing through the scrape, it goes to the step of adding up the stored time for passing through the scrape.

* * * * *